US012445572B2

(12) United States Patent
Liu et al.

(10) Patent No.: US 12,445,572 B2
(45) Date of Patent: Oct. 14, 2025

(54) METHOD AND APPARATUS OF INTERACTION VIDEO CONNECTION, ELECTRONIC DEVICE, AND STORAGE MEDIUM

(71) Applicant: Beijing Bytedance Network Technology Co., Ltd., Beijing (CN)

(72) Inventors: Hongyuan Liu, Beijing (CN); Meilin Li, Beijing (CN); Di Wu, Beijing (CN); You Wang, Beijing (CN); Wenchang Qiu, Beijing (CN); Weiwang Zhang, Beijing (CN); Yang Liu, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 214 days.

(21) Appl. No.: 18/468,602

(22) Filed: Sep. 15, 2023

(65) Prior Publication Data
US 2024/0007591 A1  Jan. 4, 2024

Related U.S. Application Data

(63) Continuation of application No. PCT/CN2022/080191, filed on Mar. 10, 2022.

(30) Foreign Application Priority Data

Mar. 15, 2021  (CN) .......................... 202110275916.8

(51) Int. Cl.
H04N 7/14 (2006.01)
(52) U.S. Cl.
CPC .................... H04N 7/147 (2013.01)
(58) Field of Classification Search
CPC ............. H04N 7/147; H04N 21/25866; H04N 21/632; H04N 21/2187; H04N 21/4788;
(Continued)

(56) References Cited

U.S. PATENT DOCUMENTS

2014/0237371 A1* 8/2014 Klemm ................ G06Q 10/109
715/730
2015/0288927 A1  10/2015 Haginas et al.
(Continued)

FOREIGN PATENT DOCUMENTS

CN     106254899 A    12/2016
CN     106550252 A    3/2017
(Continued)

OTHER PUBLICATIONS

China National Intellectual Property Administration, Notice of Rejection Issued in Application No. 202110275916.8, Jun. 8, 2023, 11 pages.
(Continued)

Primary Examiner — Phung-Hoang J Nguyen
(74) Attorney, Agent, or Firm — Alleman Hall & Tuttle LLP

(57) ABSTRACT

Embodiments of the present disclosure provide a method and an apparatus of interaction video connection, an electronic device, and a storage medium. The method includes: receiving interaction match information pushed by a server, where the interaction match information includes first information of a second client, the first information of the second client is determined according to first data of a first client, the first data is used to indicate a match demand category corresponding to the first client; generating timing information, and displaying, according to the interaction match information, the timing information and the first information of the second client, where the timing information indicates a remaining duration before requesting an establishment of a video connection with the second client; and establishing, according to the timing information, the video connection with the second client.

16 Claims, 5 Drawing Sheets

(58) Field of Classification Search
CPC .............. H04N 21/485; H04N 21/251; H04N 21/4532; H04N 21/4665; H04N 21/4666; H04N 21/4668; H04L 65/1069; H04L 67/306

See application file for complete search history.

(56) References Cited

U.S. PATENT DOCUMENTS

| | | | |
|---|---|---|---|
| 2019/0179595 A1* | 6/2019 | De Angelis | G06F 3/165 |
| 2021/0020301 A1* | 1/2021 | Dalio | G06Q 10/06398 |
| 2022/0271965 A1* | 8/2022 | Silverstein | H04L 12/1822 |

FOREIGN PATENT DOCUMENTS

| | | |
|---|---|---|
| CN | 107027048 A | 8/2017 |
| CN | 107465959 A | 12/2017 |
| CN | 109286821 A | 1/2019 |
| CN | 110191353 A | 8/2019 |
| CN | 110569470 A | 12/2019 |
| CN | 110765366 A | 2/2020 |
| CN | 110995529 A | 4/2020 |
| CN | 305956888 S | 7/2020 |
| CN | 111818359 A | 10/2020 |
| JP | 2013122751 A | 6/2013 |
| WO | 2013100851 A2 | 7/2013 |

OTHER PUBLICATIONS

China National Intellectual Property Administration, Office Action and Search Report Issued in Application No. 202110275916.8, Jan. 13, 2023, 11 pages. Submitted with partial English translation.

China National Intellectual Property Administration, International Search Report and Written Opinion Issued in Application No. PCT/CN2022/080191, Apr. 13, 2022, WIPO, 13 pages.

* cited by examiner

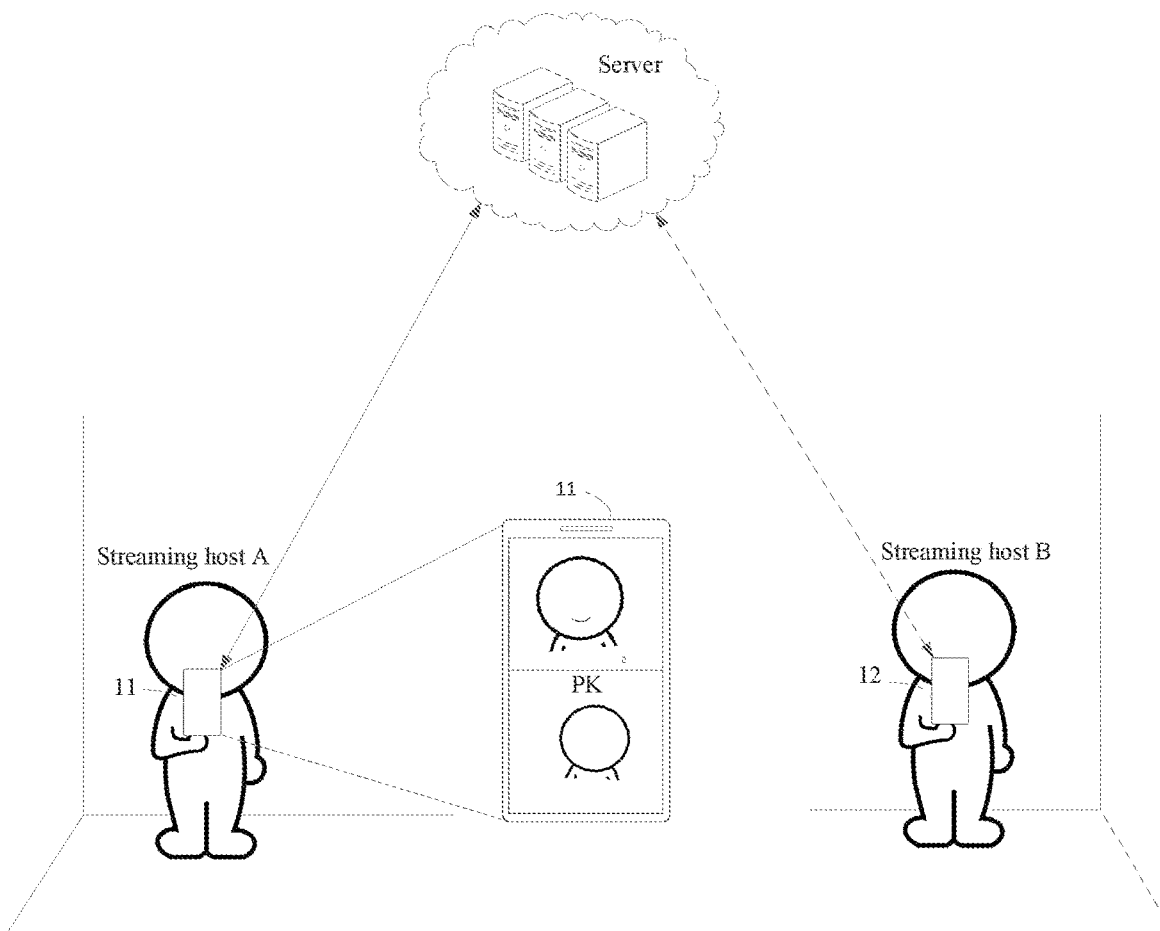

FIG. 1

S101
Receiving interaction match information pushed by a server, where the interaction match information includes first information of a second client, the first information of the second client is determined according to first data of a first client, and the first data is used to indicate a match demand category corresponding to the first client S102
Generating timing information, and displaying, according to the interaction match information, the timing information and the first information of the second client, where the timing information indicates a remaining duration before requesting an establishment of a video connection with the second client S103
Establishing, according to the timing information, the video connection with the second client

FIG. 2

METHOD AND APPARATUS OF INTERACTION VIDEO CONNECTION, ELECTRONIC DEVICE, AND STORAGE MEDIUM

CROSS-REFERENCE TO RELATED APPLICATION

The present application is a continuation of International Application No. PCT/CN2022/080191, filed on Mar. 10, 2022, which claims priority to Chinese patent application No. 202110275916.8, filed on Mar. 15, 2021 to the China National Intellectual Property Administration, entitled "METHOD AND APPARATUS OF INTERACTION VIDEO CONNECTION, ELECTRONIC DEVICE, AND STORAGE MEDIUM". Both of the aforementioned patent applications are incorporated into the present application by reference in their entireties.

TECHNICAL FIELD

Embodiments of the present disclosure relate to the field of computer and network communication technology, and in particular, to a method and an apparatus of interaction video connection, an electronic device, a storage medium, a computer program product, and a computer program.

BACKGROUND

With rapid development and popularization of the live video broadcast sector, the interaction manners in the live broadcast process become increasingly diverse, such as streaming host challenge (PK), which improves the fun and interactivity of the live broadcast process by establishing video connections and interacting between streaming hosts.

SUMMARY

Embodiments of the present disclosure provide a method and an apparatus of interaction video connection, an electronic device, a storage medium, a computer program product, and a computer program, to overcome the problems of a poor degree of match for interactive connection and a low rate of successful match between streaming hosts during the live video broadcast interaction in related arts.

In a first aspect, an embodiment of the present disclosure provides a method of interaction video connection, including:
receiving interaction match information pushed by a server, where the interaction match information includes first information of a second client, the first information of the second client is determined according to first data of a first client, and the first data is used to indicate a match demand category corresponding to the first client; generating timing information, and displaying, according to the interaction match information, the timing information and the first information of the second client, where the timing information indicates a remaining duration before requesting an establishment of a video connection with the second client; and establishing, according to the timing information, the video connection with the second client.

In a second aspect, an embodiment of the present disclosure provides an apparatus of interaction video connection, including:
a receiving unit, configured to receive interaction match information pushed by a server, where the interaction match information includes first information of a second client, the first information of the second client is determined according to first data of a first client, and the first data is used to indicate a match demand category corresponding to the first client;
a display unit, configured to generate timing information, and display, according to the interaction match information, the timing information and the first information of the second client, where the timing information indicates a remaining duration before requesting an establishment of a video connection with the second client; and
a control unit, configured to establish, according to the timing information, the video connection with the second client.

In a third aspect, an embodiment of the present disclosure provides an electronic device, including: at least one processor and a memory;
where the memory stores computer-executed instructions; and
the at least one processor executes the computer-executed instructions to cause the at least one processor to execute the method of interaction video connection as described above in the first aspect and various possible designs of the first aspect.

In a four aspect, an embodiment of the present disclosure provides a computer readable storage medium, where computer-executed instructions are stored in the computer readable storage medium, when a processor executes the computer-executed instructions, the method of interaction video connection as described above in the first aspect and various possible designs of the first aspect is implemented.

In a fifth aspect, an embodiment of the present disclosure provides a computer program product including a computer program, where when the computer program is executed by a processor, the method of interaction video connection as described above in the first aspect and various possible designs of the first aspect is implemented.

In a sixth aspect, an embodiment of the present disclosure provides a computer program, where when the computer program is executed by a processor, the method of interaction video connection as described above in the first aspect and various possible designs of the first aspect is implemented.

BRIEF DESCRIPTION OF DRAWINGS

In order to illustrate embodiments of the present disclosure or the technical solutions in the related art more clearly, the drawings that need to be used in the description of the embodiments or the related art will be briefly introduced in the following. Obviously, the drawings in the following description are some embodiments of the present disclosure, and for those of ordinary skill in the art, other drawings can be obtained according to these drawings without paying any creative effort.

FIG. 1 is a scenario diagram of a method of interaction video connection provided by an embodiment of the present disclosure.

FIG. 2 is schematic flowchart I of a method of interaction video connection provided by an embodiment of the present disclosure.

DESCRIPTION OF EMBODIMENTS

Figure 3:
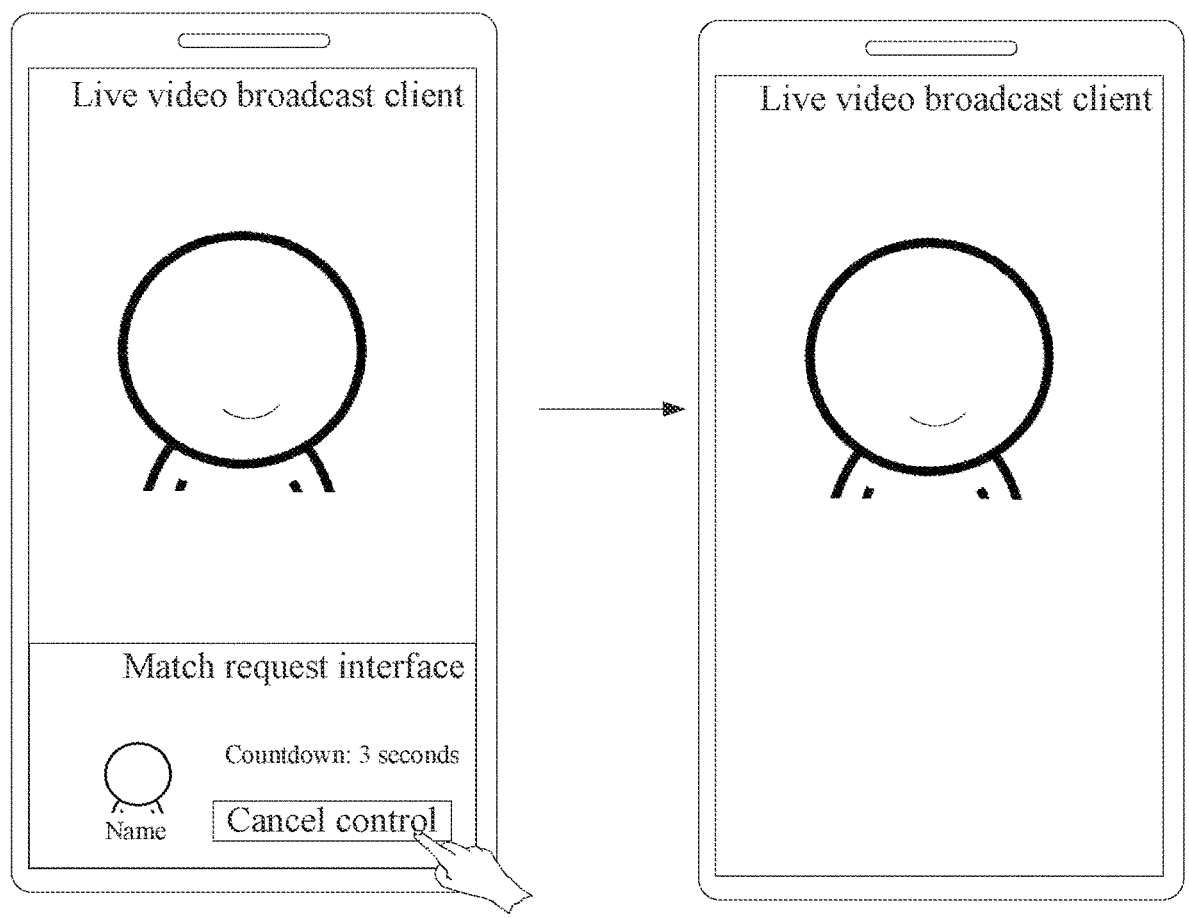
FIG. 3 is a schematic diagram of displaying a match request interface in a live video broadcast client provided by an embodiment of the present disclosure.

In order to make the objectives, technical solutions and advantages of embodiments of the present disclosure clearer, the technical solutions in the embodiments of the present disclosure will be described clearly and comprehensively in combination with the drawings in the embodiments of the present disclosure. Obviously, the described embodiments are part of the embodiments of the present disclosure, rather than all of them. All other embodiments obtained by those of ordinary skill in the art without paying any creative effort based on the embodiments in the present disclosure belong to the protection scope of the present disclosure.

The following is an explanation of an application scenario of an embodiment of the present disclosure.

FIG. 1 is a scenario diagram of a method of interaction video connection provided by an embodiment of the present disclosure. The method provided by this embodiment can be applied to a live video broadcast scenario. As shown in FIG. 1, a first terminal device 11 (or a first client, the first terminal device is a terminal device corresponding to the first client) of streaming host A and a second terminal device 12 (or a second client, the second terminal device is a terminal device corresponding to the second client) of streaming host B are connected communicatively via a server. During the live broadcast, streaming host A establishes a video connection with streaming host B through "streaming host challenge" (also referred to as PK) and engages in a video interaction, which increases fun and interactivity of the live broadcast process, enhances the content value of the live broadcast, and attracts more live broadcast viewers to watch. The first client may be installed in the first terminal device, and the second client may be installed in the second terminal device. In all embodiments in the present disclosure, all method steps and implemented functions performed by the first terminal device can be performed or implemented by the first client, and all method steps and implemented functions performed by the second terminal device can be performed or implemented by the second client.

In related art, for implementation manners for PK between streaming hosts in the above scenario, apart from a direct request through a friend list, the usual practice is that a streaming host matches, through a random search, a target streaming host among all streaming hosts who are also searching or who are in a ready state during the same time period; and establishes a interaction video connection. However, due to distinctiveness of the live broadcast sector, the time for live broadcast performance by different video streaming hosts is not fixed. When a streaming host has willingness to engage in PK with other streaming host and conducts PK search through a random search, the number of streaming hosts who are also conducting a random search during the same period is limited, i.e. the number of streaming hosts who are available by searching is limited, hence, it happens frequently that a live broadcast platform system is difficult to match streaming hosts with the same interactive match demand, which leads to a poor degree of match between streaming hosts and a problem of a low rate of effective match between streaming hosts.

Please refer to FIG. 2. FIG. 2 is schematic flowchart I of a method of interaction video connection provided by an embodiment of the present disclosure. The method of this embodiment may be applied in a first terminal device, and a live video broadcast client is installed in the first terminal device (i.e. the first client, and the method may also be applied in the first). The method of interaction video connection includes:

S101: receiving interaction match information pushed by a server, where the interaction match information includes first information of a second client, the first information of the second client is determined according to first data of a first client, and the first data is used to indicate a match demand category corresponding to the first client.

The match demand category corresponding to the first client may be a type of a video connection or an interactive connection such as PK or co-hosting that the first client (or a streaming host using the first client or the first terminal device) wants to make, in a scenario of a video connection or an interactive connection such as PK or co-hosting; where, as one kind of the interactive video connections, co-hosting may refer to a voice co-hosting or a video co-hosting.

Illustratively, referring the application scenario shown in FIG. 1, the first terminal device and the second terminal device are respectively connected with the server. The server is, for example, a backend server of a live broadcast platform. A live video broadcast client is installed and operated within both the first terminal device and the second terminal device, which may be the first client and the second client respectively. During operating the live video broadcast client, the first terminal device can receive the interaction match information pushed by the server. In a possible implementation, before the first terminal device receives the interaction match information pushed by the server, the first terminal device first sends request information to the server by the live video broadcast client, to cause the server to send the interaction match information to the first terminal device. An occasion for the first terminal device to send the request information may be customized by a user, or automatically generated based on known technology, which is not limited here.

Furthermore, the interaction match information includes the first information of the second client, the first information may be account information for logging into the live video broadcast client in the second terminal device, such as avatar information, etc. The first information of the second client corresponds to a user of the live video broadcast client in the second terminal device, i.e. another streaming host. The first information of the second client is determined by the server according to the first data of the first client, where the first data of the first client is data used to indicate a match demand category of a streaming host using the first client. Referring to related art for more details, which is not described in detail here.

S102: generating timing information, and displaying, according to the interaction match information, the timing information and the first information of the second client, where the timing information indicates a remaining duration before requesting an establishment of a video connection with the second client. The match demand category corresponding to the first client may be used to indicate a category of the video connection that the first client (or a streaming host using the first client or the first terminal device) wants to make. The video connection may be a connection for PK or co-hosting.

Illustratively, the timing information includes a countdown value. In the live video broadcast running within the first terminal device, the countdown value and the first information in the interaction match information are displayed. When the countdown value is a first preset value, a video connection request is sent to the second terminal device to request an establishment of a video connection with the second terminal device, thereby achieving video interaction between a streaming host on the side of the first terminal device and a streaming host on the side of the second terminal device.

In a possible implementation, the timing information and the first information of the second client are displayed within a match request interface. FIG. 3 is a schematic diagram of displaying a match request interface in a live video broadcast client provided by an embodiment of the present disclosure. As shown in FIG. 3, illustratively, when the first terminal device receives the interaction match information, the match request interface pops up at the bottom of a home interface of the live video broadcast client. Within the match request interface, the timing information and the first information of the second client are displayed, where, the timing information is a countdown value of 3 seconds; the first information of the second client includes information, such as an avatar. The purpose of displaying the remaining duration before requesting an establishment of a video connection with the second terminal device to the streaming host on the side of the first terminal device, as well as displaying the first information of the second client is thus achieved.

S103: establishing, according to the timing information, the video connection with the second client.

Furthermore, illustratively, in the displayed match request interface, second information of the first client is further displayed, the second information may be account information for logging into the live video broadcast client in the first terminal device, such as avatar information, etc. When the countdown value is a preset value, such as 0, the first terminal device sends consent information indicating consent to the establishment of the video connection with the second terminal device to the server, at the same time, the first information of the second terminal device within the match request interface is marked, to show that the streaming host on the side of the first terminal device agrees to establish the video connection with the streaming host on the side of the second terminal device. After receiving the consent information uploaded by the first terminal device, the server will synchronize it with the second terminal device. Specifically, on the live video broadcast client running within the second terminal device, the consent information is displayed to inform the streaming host on the side of the second terminal device that the streaming host on the side of the first terminal device has agreed to establish a video connection. Afterwards, if the server receives consent information uploaded by the second terminal device, the video connection is established between the live video broadcast client of the first terminal device and the live video broadcast client of the second terminal device; where, the consent information uploaded by the second terminal device is similar in implementation and purpose to the consent information uploaded by the first terminal device, which not be repeated here.

In the steps of this embodiment, by using the timing information, the first terminal device establishes the video connection with the second terminal device without the need for any operation by the streaming hosts, which improves the efficiency of interaction video match, reduces the interference of the interaction matching process on the streaming host's live broadcast process, and improves the coherence of the content of the streaming host's live broadcast.

Figure 4:
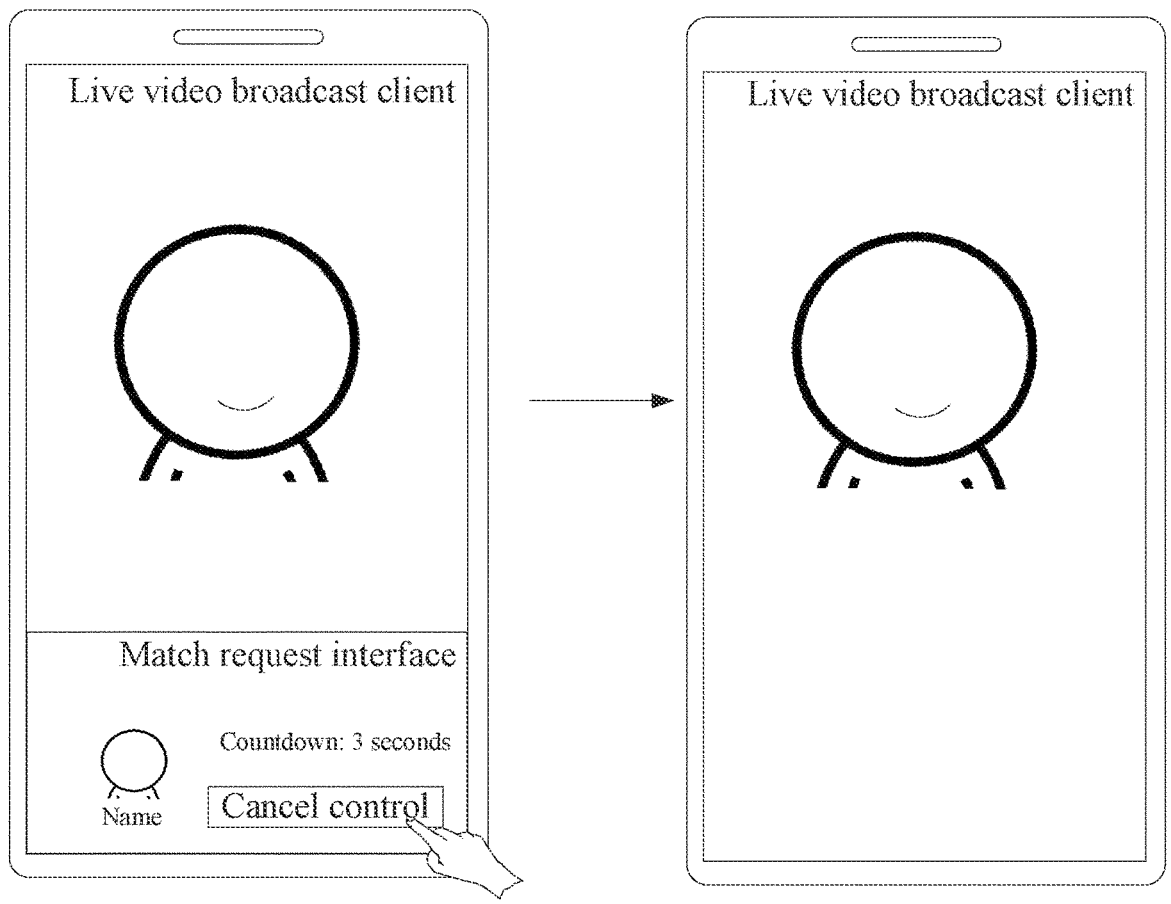
FIG. 4 is a schematic diagram of a cancel control provided by an embodiment of the present disclosure.

In one possible situation, if the streaming host on the side of the first terminal device does not engage in video interaction with the streaming host on the side of the second terminal device after seeing the first information of the second terminal device, the streaming host on the side of the first terminal device may refuse to establish a video connection with the streaming host on the side of the second terminal device before the countdown value corresponding to the timing information ends. Illustratively, the match request interface further includes a cancel control. FIG. 4 is a schematic diagram of a cancel control provided by an embodiment of the present disclosure. Referring to FIG. 4, an operation of refusing to establish the video connection with the second terminal device can be implemented by clicking to trigger the cancel control. For the first terminal device, the steps of this embodiment further include: triggering the cancel control to close the match request interface; and sending first interaction refusal information, where the first interaction refusal information indicates that the first terminal device refuses the video connection request corresponding to the interaction match information.

In another possible situation, if second interaction refusal information sent by the server is received, the match request interface is closed; where, the second interaction refusal information is information sent from the second terminal device to the server, and the second interaction refusal information indicates that the second terminal device refuses the video connection request corresponding to the interaction match information.

The second interaction refusal information may be generated by refusal information sent from the second terminal device to the server, or may be generated by the server according to other data, such as a black list of the first terminal device or the second terminal device. This will not be specifically limited here.

In the steps of this embodiment, when the first terminal device receives the interactive match information pushed by the server and displays the content thereof, the video connection with the second terminal device can be cancelled through an operation, or, cancel the video connection with the second terminal device based on an operation of the streaming host on the side of the second terminal device, and the matching request interface used to display the content of the interaction match information is automatically closed in that case, which improves the flexibility and match efficiency in the interaction match process, reduces the interference of the interaction matching process on the streaming host's live broadcast process, and improves the coherence of the content of the streaming host's live broadcast.

The method provided in the embodiment of the present disclosure includes: receiving the interaction match information pushed by the server, where the interaction match information includes the first information of the second client, the first information of the second client is determined according to the first data of the first client, and the first data is used to indicate a match demand category corresponding to the first client; generating the timing information, and displaying, according to the interaction match information, the timing information and the first information of the second client, where the timing information indicates the remaining duration before requesting an establishment of the video connection with the second client; and establishing, according to the timing information, the video connection with the second client. Since that the first can automatically receive and display the interaction match information containing the first information of the second client pushed by the server, and the first information is determined according to the match demand category corresponding to the first client of the first terminal device, and the timing information that can automatically trigger the video connection is generated, there is no need to manually perform searching and connecting for interaction video in the first terminal device, a match pool for establishing a video interaction connection by the streaming host is expanded, the degree of match for interactive connection and the rate of successful match between streaming hosts are improved.

Figure 5:
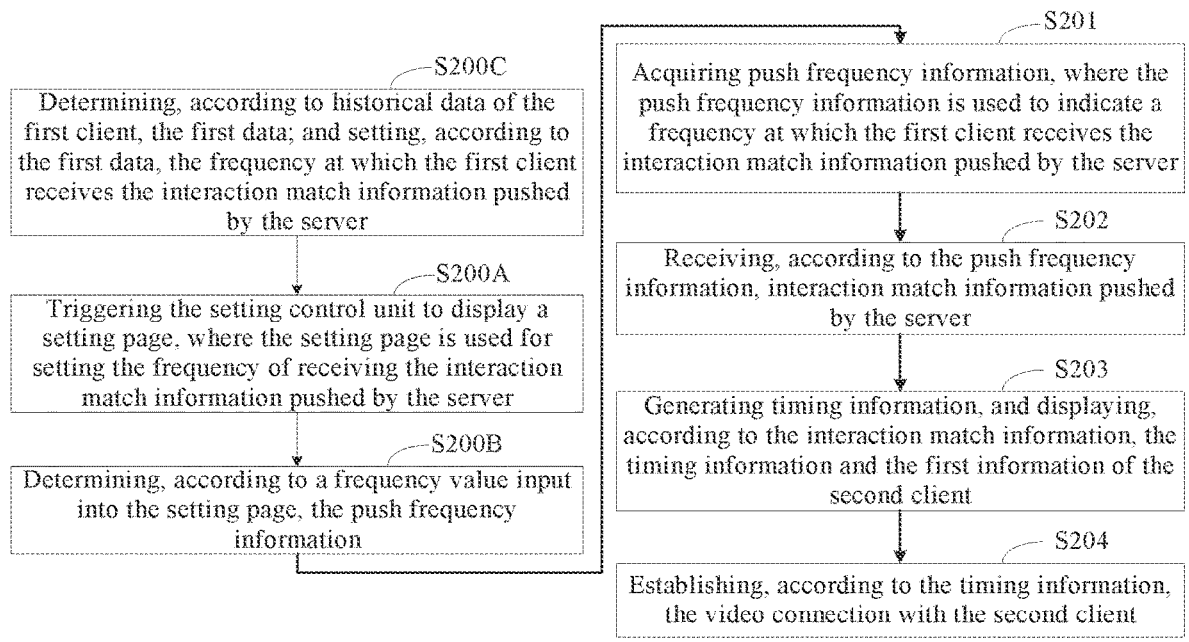
FIG. 5 is schematic flowchart II of a method of interaction video connection provided by an embodiment of the present disclosure.

FIG. 5 is schematic flowchart II of a method of interaction video connection provided by an embodiment of the present disclosure. A process before step S101 is described in detail in this embodiment, the method of interaction video connection includes:

S201, acquiring push frequency information, where the push frequency information is used to indicate a frequency at which the first client receives the interaction match information pushed by the server.

Illustratively, the push frequency information is a preset configuration parameter within the first terminal device, and more specifically, the push frequency information is a configuration parameter of a live video broadcast client running within the first terminal device. The higher the frequency corresponding to the push frequency information, the more frequently the server pushes the interaction match information to the first terminal device. The push frequency information may be modified according to received instructions.

Illustratively, the timing information and the first information of the second terminal device are displayed within the match request interface, where the match request interface further includes a setting control unit. In a possible implementation, before step S201, the method further includes:

S200A, triggering the setting control unit to display a setting page, where the setting page is used for setting the frequency of receiving the interaction match information pushed by the server.

S200B, determining, according to a frequency value input into the setting page, the push frequency information.

Figure 6:
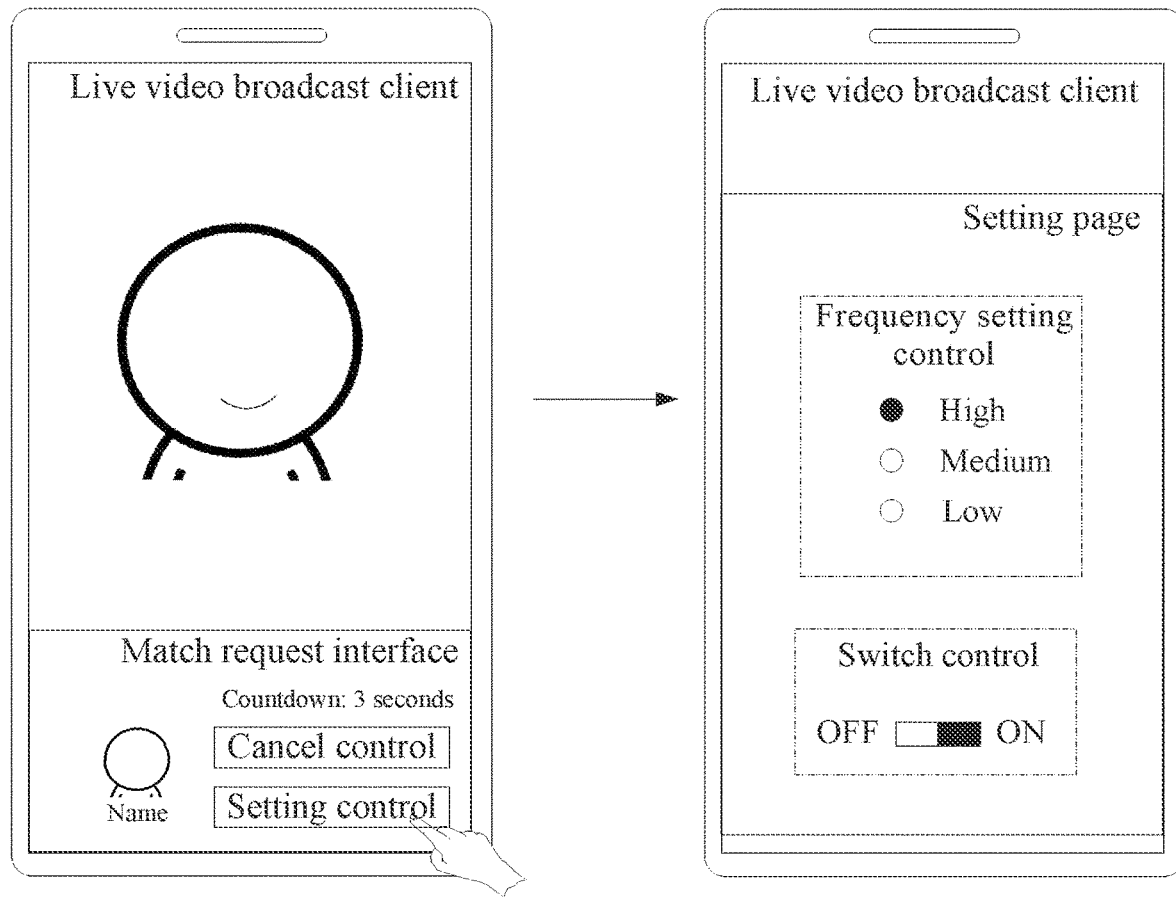
FIG. 6 is a schematic diagram of displaying a setting page provided by an embodiment of the present disclosure.

FIG. 6 is a schematic diagram of displaying a setting page provided by an embodiment of the present disclosure. Referring to FIG. 6, illustratively, by clicking on an icon corresponding to the setting control unit, the setting control unit is triggered, and the setting page pops up in the live video broadcast client. The setting page includes a frequency setting control for setting the frequency of the server pushing the interaction match information. More specifically, as shown in FIG. 6, according to the frequency setting control, the frequency at which the server pushes the interaction match information can be set to three levels: "high", "medium", and "low". Of course, the implementation form of the setting control can also be a text box (not shown in the drawings) for entering specific numerical values. By entering a specific numerical value, a user or a streaming host can set the frequency of the server pushing the interaction match information. For example, numerical value 1 represents pushing once every day, numerical value 5 represents pushing 5 times every day, and numerical value 0 represents not enabling the push function.

In another possible implementation, as shown in FIG. 6, the setting page further includes a switch control for setting the on and off states of the push function. When the switch control is in the "ON" state, the server pushes the interaction match information to the first terminal device, and the frequency of the server pushing the interaction match information can be set according to the setting control; when the switch control is in the "OFF" state, the server does not push the interaction match information to the first terminal device, and the setting control is in an unavailable state.

In a possible implementation, when the switch control is in the "OFF" state or the frequency in the setting page is set to a second preset value (for example, the frequency is set to 0), then at a preset time, for example, when the live video broadcast client is logged into for the first time every day, prompt information is issued, such as a prompt sound, a prompt vibration, etc.

In a possible implementation, before step S200A, the method further includes:

S200C, determining, according to historical data of the first client, the first data; and setting, according to the first data, the frequency at which the first client receives the interaction match information pushed by the server.

Illustratively, the historical data of the first client can be, when co-hosting of the first client is successfully established in history, a type of live broadcast room (such as a live broadcast room of singing type, a live broadcast room of dance type, a live broadcast room of movies type, and a live broadcast room of game type, etc.) of an inviter of co-hosting accepted by an invitee of co-hosting or a type of live broadcast room of an invitee of co-hosting requested by an inviter of co-hosting, from which the first data indicating the match demand category of the interactive connection can be determined (for example, the match demand category is that there is a need of taking an inviter/invitee of co-hosting of the live broadcast room of singing type and/or the live broadcast room of dance type as an object for co-hosting). For example, the first data can include a classification identifier of the type of live broadcast room of an inviter/invitee of co-hosting that indicates a matching demand corresponding to the live video broadcast client, for example, classification identifier "#01" represents "movies type", classification identifier "#02" represents "games type", classification identifier "#03" represents "singing type", and classification identifier "#04" represents "dance type". Referring to related arts for more details.

Illustratively, the match demand category corresponding to the first client may be, in a case of the first client as an invitee, a type of a video connection inviter which is provided as a candidate in the video interactive connection required by the first client; the match demand category corresponding to the first client may also be, in a case of the first client as an inviter, a type of a video connection invitee which is provided as a candidate in the video interactive connection required by the first client. The first data may be used to indicate data of the type of the above video connection inviter (in a case of the first client as an invitee in the video interactive connection), or data of the type of the above video connection invitee (in a case of the first client as an invitee in the video interactive connection).

Illustratively, the first data may be customized by a user, for example, the first data is determined by input of a user, e.g. the user inputs the first data through an interface (e.g. a setting page); the first data can be obtained by predicting.

Furthermore, after the first data is determined, it can be concluded that the demand for interaction videos varies depending on the content corresponding to different match demand categories. A match is performed according to respective match demand categories corresponding to respective live video broadcast clients, to improve the rate of effective match.

In a possible implementation, after determining the first data, the method further includes: uploading the first data to the server, to enable the server to generate the interaction match information.

In a possible implementation, the method further includes: determining, according to the first data, a push time for the server to push the interaction match information to the first client, and uploading the push time to the server.

Specifically, the first data further includes live broadcast time data used to indicate the first client's usual live broadcast time. According to the live broadcast time data, the push time matched therewith when the interaction match information is pushed can be determined, thereby improving the rate of successful match of interaction video.

S202, receiving, according to the push frequency information, interaction match information pushed by the server.

Furthermore, the time to send a push request to the server is set according to the push frequency information, or the push frequency information is sent to the server to enable the server to push according to the push frequency information, thereby achieving the purpose of receiving the interaction match information pushed by the server according to the push frequency information. This process is described in detail in step S101 of the embodiment shown in FIG. 2, and will not be repeated here.

S203, generating timing information, and displaying, according to the interaction match information, the timing information and the first information of the second client.

S204: establishing, according to the timing information, the video connection with the second client.

In this embodiment, the implementation of steps S203 to S204 is the same as the implementation of steps S102 to S103 in the embodiment shown in FIG. 2 of the present disclosure, and will not be repeated here.

Figure 7:
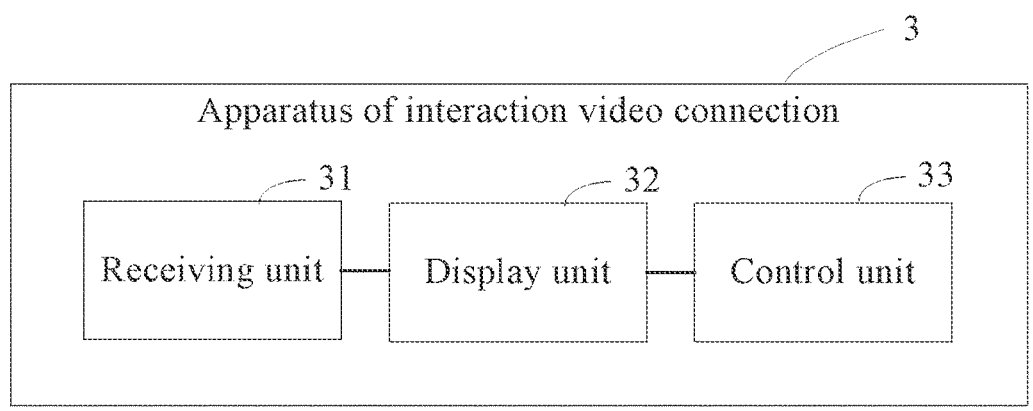
FIG. 7 is a structural block diagram of an apparatus of interaction video connection provided by an embodiment of the present disclosure.

Corresponding to the method of interaction video connection of the above embodiments, FIG. 7 is a structural block diagram of an apparatus of interaction video connection provided by an embodiment of the present disclosure. For ease of explanation, only parts related to the embodiments of the present disclosure are shown. Referring to FIG. 7, the apparatus 3 of interaction video connection includes:
- a receiving unit 31, configured to receive interaction match information pushed by a server, where the interaction match information includes first information of a second client, the first information of the second client is determined according to first data of a first client, and the first data is used to indicate a match demand category corresponding to the first client;
- a display unit 32, configured to generate timing information, and display, according to the interaction match information, the timing information and the first information of the second client, where the timing information indicates a remaining duration before requesting an establishment of a video connection with the second client; and
- a control unit 33, configured to establish, according to the timing information, the video connection with the second client.

In an embodiment of the present disclosure, the timing information includes a countdown value, and the control unit 33 is specifically configured to: send, when the countdown value is a first preset value, a video connection request to the second client, to establish a video connection with the second client.

In an embodiment of the present disclosure, the timing information and the first information of the second client are displayed within a match request interface, the match request interface further includes a cancel control, and the display unit 32 is further configured to: trigger the cancel control to close the match request interface; and send first interaction refusal information, where the first interaction refusal information indicates that the first client refuses the video connection request corresponding to the interaction match information.

In an embodiment of the present disclosure, the timing information and the first information of the second client are displayed within the match request interface, and the display unit 32 is further configured to: close, if second interaction refusal information sent by the server is received, the match request interface; where, the second interaction refusal information is information sent from the second client to the server, and the second interaction refusal information indicates that the second client refuses the video connection request corresponding to the interaction match information.

In an embodiment of the present disclosure, the timing information and the first information of the second client are displayed within the match request interface, the match request interface further includes a setting control unit, and the display unit 32 is further configured to: trigger the setting control unit to display a setting page, where the setting page is used for setting a frequency of receiving the interaction match information pushed by the server.

In an embodiment of the present disclosure, the display unit 32 is further configured to: issue, if a frequency at which the first client receives the interaction match information pushed by the server is set to a second preset value, prompt information at a preset time.

In an embodiment of the present disclosure, the control unit 33 is further configured to: determine, according to historical data of the first client, the first data; and set, according to the first data, a frequency at which the first client receives the interaction match information pushed by the server.

In an embodiment of the present disclosure, the control unit 33 is further configured to: upload the first data to the server, to enable the server to generate the interaction match information; and/or, determine a time for the server to push the interaction match information to the first client.

The device provided in this embodiment can be used to execute the technical solution of the above method embodiments, and the implementation principle and technical effect are similar and will not be repeated here in this embodiment.

Figure 8:
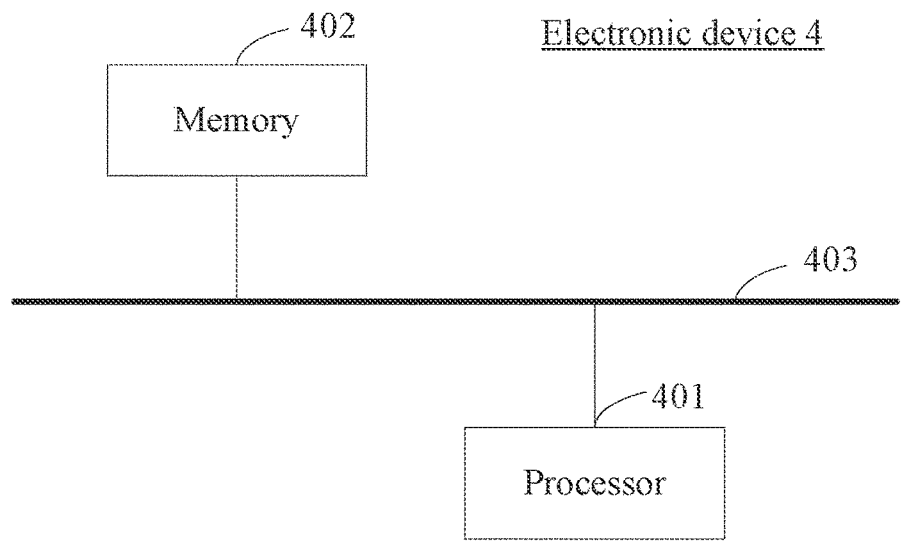
FIG. 8 is a schematic structure diagram of an electronic device provided by an embodiment of the present disclosure.

FIG. 8 is a schematic structure diagram of an electronic device provided by an embodiment of the present disclosure. As shown in FIG. 8, the electronic device 4 includes at least one processor 401 and a memory 402;
- where the memory 402 stores computer-executed instructions;
- the at least one processor 401 executes the computer-executed instructions stored in the memory 402, to cause the at least one processor 401 to execute the method of interaction video connection in the embodiments shown in FIG. 2 to FIG. 6.

The processor 401 and the memory 402 are connected through a bus 403.

Relevant explanations can be understood by referring to relevant description and effects corresponding to the steps in the corresponding embodiments shown in FIG. 2 to FIG. 7, which will not elaborate too much here.

Figure 9:
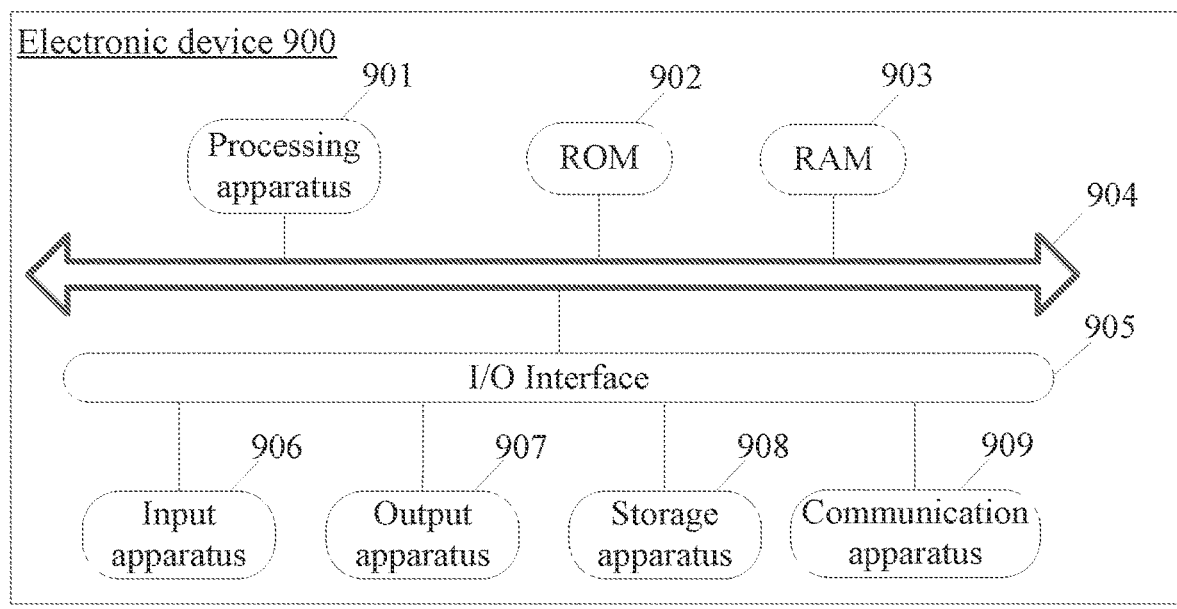
FIG. 9 is a schematic diagram of a hardware structure of an electronic device provided by an embodiment of the present disclosure.

Referring to FIG. 9, a schematic diagram of a structure of an electronic device 900 suitable for implementing an embodiment of the present disclosure is shown, the electronic device 900 may be a terminal device or a server. The terminal device can include but is not limited to a mobile terminal, such as a mobile phone, a laptop, a digital broadcast receiver, a personal digital assistant (Personal Digital Assistant, PDA for short), a portable android device (Portable Android Device, PAD for short), a portable media player (Portable Media Player, PMP for short), a vehicle-mounted terminal (such as a vehicle-mounted navigation terminal), etc., and a fixed terminal, such as a digital TV, a desktop computer, etc. The electronic device shown in FIG. 9 is only an example and should not impose any limitations on functionality and the scope of use of the embodiment of the present disclosure.

As shown in FIG. 9, the electronic device 900 may include a processing apparatus (such as, a central processor, a graphics processor and the like) 901, which can execute various appropriate actions and processes according to a program stored in a read only memory (Read Only Memory, ROM for short) 902 or a program loaded into a random access memory (Random Access Memory, RAM for short) 903 from a storage apparatus 908. In the RAM 903, various programs and data necessary for the operation of the electronic device 900 are also stored. The processing apparatus 901, ROM 902 and RAM 903 are connected to each other through a bus 904. An input/output (Input/Output, I/O for short) interface 905 is also connected to the bus 904.

Typically, the following apparatus may be connected to the I/O interface 905: an input apparatus 906 including, for example, a touch screen, a touch pad, a keyboard, a mouse, a camera, a microphone, an accelerometer, a gyroscope and the like; an output apparatus 907 including, for example, a liquid crystal display (Liquid Crystal Display, LCD for short), a speaker, a vibrator and the like; a storage apparatus 908 including, for example, a magnetic tape, a hard disk and like; and a communication apparatus 909. The communication apparatus 909 may allow the electronic device 900 to communicate wirelessly or wired with other devices to exchange data. While FIG. 9 shows the electronic device 900 with various apparatuses, it should be understood that not all of the illustrated apparatuses are required to be implemented or provided. More or fewer apparatuses may alternatively be implemented or provided.

In particular, according to the embodiments of the present disclosure, the processes described above with reference to the flowcharts may be implemented as a computer software program. For example, an embodiment of the present disclosure includes a computer program product including a computer program carried on a computer readable medium, the computer program containing program codes for executing the methods illustrated in the flowcharts. In such embodiments, the computer program may be downloaded and installed from the network via the communication apparatus 909, or installed from the storage apparatus 908, or installed from the ROM 902. When the computer program is executed by the processing apparatus 901, the above-mentioned functions defined in the methods of the embodiments of the present disclosure are executed.

It should be noted that, the above-mentioned computer readable medium in the present disclosure may be a computer readable signal medium or a computer readable storage medium, or any combination of the above two. The computer readable storage medium may be, but not limited to, for example, an electrical, magnetic, optical, electromagnetic, infrared, or semiconductor system, apparatus or device, or a combination of any of the above. More specific examples of the computer readable storage media may include, but are not limited to, an electrical connection with one or more wires, a portable computer disk, a hard disk, a random access memory (RAM), a read only memory (ROM), an erasable programmable read only memory (Erasable Programmable ROM, EPROM or a flash memory), an optical fiber, a portable compact disk read only memory (Compact Disc ROM, CD-ROM), an optical storage device, a magnetic storage device or any suitable combination of the above. In the present disclosure, the computer readable storage medium may be any tangible medium in which the program is contained or stored, and the program can be used by or in conjunction with an instruction execution system, apparatus, or device. In the present disclosure, the computer readable signal medium may include a data signal propagated in a baseband or as a part of a carrier wave, and carries computer readable program codes therein. The propagated data signal may take a variety of forms, including but not limited to an electromagnetic signal, an optical signal or any suitable combination of the above. The computer readable signal medium may also be any computer readable medium other than the computer readable storage medium, the computer readable signal medium can transmit, propagate or transport the program for use by or in conjunction with the instruction execution system, apparatus or device. Program codes contained in the computer readable medium may be transmitted by any suitable medium, which includes, but not limited to, an electrical wire, an optical fiber cable, a radio frequency (Radio Frequency, RF for short) or the like, or any suitable combination of the above.

The computer readable medium may be contained in the above electronic device; or may exist alone without being assembled into the electronic device.

The above computer readable medium carries one or more programs, and when the one or more programs are executed by the electronic device, the electronic device is enabled to execute the methods shown in the above embodiments.

Computer program codes for performing operations of the present disclosure may be written in one or more programming languages or a combination thereof, the above programming language includes but not limited to object-oriented programming languages, such as Java, Smalltalk, C++, and also includes conventional procedural programming languages, such as the "C" language or similar programming languages. The program codes may be executed entirely on a user's computer, partly on the user's computer, as a stand-alone software package, partly on the user's computer and partly on a remote computer, or entirely on the remote computer or a server. In a case involving the remote computer, the remote computer may be connected to the user's computer through any kind of network, including the local area network (Local Area Network, LAN for short) or wide area network (Wide Area Network, WAN for short), or may be connected to an external computer (for example, connected through the Internet using an Internet service provider).

Flowcharts and block diagrams in the drawings illustrate possible architectures, functionalities, and operations of systems, methods, and computer program products according to various embodiments of the present disclosure. In this point, each block in the flowchart or the block diagram may represent a module, a program segment or a portion of codes, and the module, program segment or portion of codes contains one or more executable instructions for implementing the specified logical function. It should also be noted that, in some alternative implementations, the functions indicated in the blocks may occur in an order different from that indicated in the figures. For example, two blocks shown in succession may, in fact, be executed substantially concurrently, or may sometimes be executed in the reverse order, which is depended upon the functionality involved. It is also noted that each block in the block diagrams and/or flowcharts, and combinations of blocks in the block diagrams and/or flowcharts, can be implemented in a dedicated hardware-based system that performs specified functions or operations, or can be implemented in a combination of dedicated hardware and computer instructions.

Units involved in the embodiments of the present disclosure may be implemented in a software manner, and may also be implemented in a hardware manner. The name of a unit does not constitute a limitation of the unit itself under certain circumstances, for example, the first acquiring unit may also be described as "a unit acquiring at least two Internet Protocol addresses".

The functions above described herein may be performed, at least in part, by one or more hardware logic components. For example, without limitation, exemplary types of hardware logic components that may be used include: a field programmable gate array (Field Programmable Gate Array, FPGA for short), an application specific integrated circuit (Application Specific Integrated Circuit, ASIC for short), an Application Specific Standard Product (Application Specific Standard Product, ASSP for short), a system on a chip (System on a Chip, SOC for short), a complex programmable logical device (Complex Programmable Logical Device, CPLD for short) and the like.

In the context of the present disclosure, a machine readable medium may be a tangible medium that may contain or store a program for use by or in conjunction with the instruction executable system, apparatus, or device. The machine-readable medium may be a machine-readable signal medium or a machine-readable storage medium. The machine readable medium may include, but not limited to, an electronic, magnetic, optical, electromagnetic, infrared or semiconductor system, apparatus or device, or any suitable combination of the above. More specific examples of the machine readable storage medium would include one or more wires-based electrical connections, portable computer disks, hard disks, random access memory (RAM), read only memory (ROM), erasable programmable read-only memory (EPROM or flash memory), fiber optics, compact disk read only memory (CD-ROM), optical storage devices, magnetic storage devices, or any suitable combination of the above.

In a first aspect, according to one or more embodiments of the present disclosure, a method of interaction video connection is provided, where the method is applied to a first client, and includes: receiving interaction match information pushed by a server, where the interaction match information includes first information of a second client, the first information of the second client is determined according to first data of the first client, the first data is used to indicate a match demand category corresponding to the first client; generating timing information, and displaying, according to the interaction match information, the timing information and the first information of the second client, where the timing information indicates a remaining duration before requesting an establishment of a video connection with the second client; and establishing, according to the timing information, the video connection with the second client.

According to one or more embodiments of the present disclosure, the timing information includes a countdown value, and the establishing, according to the timing information, the video connection with the second client includes: sending, when the countdown value is a first preset value, a video connection request to the second client, to establish a video connection with the second client.

According to one or more embodiments of the present disclosure, the timing information and the first information of the second client are displayed within a match request interface, the match request interface further includes a cancel control, and the method further includes: triggering the cancel control to close the match request interface; and sending first interaction refusal information, where the first interaction refusal information indicates that the first client refuses the video connection request corresponding to the interaction match information.

According to one or more embodiments of the present disclosure, the timing information and the first information of the second client are displayed within the match request interface, and the method further includes: closing, if second interaction refusal information sent by the server is received, the match request interface; where, the second interaction refusal information is information sent from the second client to the server, and the second interaction refusal information indicates that the second client refuses the video connection request corresponding to the interaction match information.

According to one or more embodiments of the present disclosure, the timing information and the first information of the second client are displayed within the match request interface, the match request interface further includes a setting control unit, and the method further includes: triggering the setting control unit to display a setting page, where the setting page is used for setting a frequency of receiving the interaction match information pushed by the server.

According to one or more embodiments of the present disclosure, the method further includes: issuing, if a frequency at which the first client receives the interaction match information pushed by the server is set to a second preset value, prompt information at a preset time.

According to one or more embodiments of the present disclosure, the method further includes: determining, according to historical data of the first client, the first data; and setting, according to the first data, the frequency at which the first client receives the interaction match information pushed by the server.

According to one or more embodiments of the present disclosure, the method also includes: uploading the first data to the server, to enable the server to generate the interaction match information; and/or, determining a time for the server to push the interaction match information to the first client.

In a second aspect, according to one or more embodiments of the present disclosure, an apparatus of interaction video connection is provided, including:
  a receiving unit, configured to receive interaction match information pushed by a server, where the interaction match information includes first information of a second client, the first information of the second client is determined according to first data of a first client, and the first data is used to indicate a match demand category corresponding to the first client;
  a display unit, configured to generate timing information, and display, according to the interaction match information, the timing information and the first information of the second client, where the timing information indicates a remaining duration before requesting an establishment of a video connection with the second client; and a control unit, configured to establish, according to the timing information, the video connection with the second client.

According to one or more embodiments of the present disclosure, the timing information includes a countdown value, and the control unit is specifically configured to: send, when the countdown value is a first preset value, a video connection request to the second client, to establish a video connection with the second client.

According to one or more embodiments of the present disclosure, the timing information and the first information of the second client are displayed within a match request interface, the match request interface further includes a cancel control, and the display unit is further configured to: trigger the cancel control to close the match request interface; and send first interaction refusal information, where the first interaction refusal information indicates that the first client refuses the video connection request corresponding to the interaction match information.

According to one or more embodiments of the present disclosure, the timing information and the first information of the second client are displayed within the match request interface, and the display unit is further configured to: close, if second interaction refusal information sent by the server is received, the match request interface; where, the second interaction refusal information is information sent from the second client to the server, and the second interaction refusal information indicates that the second client refuses the video connection request corresponding to the interaction match information.

According to one or more embodiments of the present disclosure, the timing information and the first information of the second client are displayed within the match request interface, the match request interface further includes a setting control unit, and the display unit is further configured to: trigger the setting control unit to display a setting page, where the setting page is used for setting a frequency of receiving the interaction match information pushed by the server.

According to one or more embodiments of the present disclosure, the display unit is further configured to: issue, if a frequency at which the first client receives the interaction match information pushed by the server is set to a second preset value, prompt information at a preset time.

According to one or more embodiments of the present disclosure, the control unit is further configured to: determine, according to historical data of the first client, the first data; and set, according to the first data, a frequency at which the first client receives the interaction match information pushed by the server.

According to one or more embodiments of the present disclosure, the control unit is further configured to: upload the first data to the server, to enable the server to generate the interaction match information; and/or, determine a time for the server to push the interaction match information to the first client.

In a third aspect, according to one or more embodiments of the present disclosure, an electronic device is provided, including: at least one processor and a memory;

where the memory stores computer-executed instructions; the at least one processor executes the computer-executed instructions to cause the at least one processor to execute the method of connecting interaction video as described above in the first aspect and various possible designs of the first aspect.

In a fourth aspect, according to one or more embodiments of the present disclosure, computer readable storage medium is provided, where computer-executed instructions are stored in the computer readable storage medium, when a processor executes the computer-executed instructions, the method of interaction video connection as described above in the first aspect and various possible designs of the first aspect is implemented.

In a fifth aspect, an embodiment of the present disclosure provides a computer program product including a computer program, when the computer program is executed by a processor, the method of interaction video connection as described above in the first aspect and various possible designs of the first aspect is implemented.

In a sixth aspect, an embodiment of the present disclosure provides a computer program, when the computer program is executed by a processor, the method of interaction video connection as described above in the first aspect and various possible designs of the first aspect is implemented.

The embodiments of the present disclosure provide a method and an apparatus of interaction video connection, an electronic device, a storage medium, a computer program product, and a computer program. The method includes: receiving interaction match information pushed by a server, where the interaction match information includes first information of a second client, the first information of the second client is determined according to first data of a first client, and the first data is used to indicate a match demand category corresponding to the first client; generating timing information, and displaying, according to the interaction match information, the timing information and the first information of the second client, where the timing information indicates a remaining duration before requesting an establishment of a video connection with the second client; and establishing, according to the timing information, the video connection with the second client. Since that the first client can automatically receive and display the interaction match information containing the first information of the second client pushed by the server, and the first information is determined according to the match demand category corresponding to the first client of the first client, and the timing information that can automatically trigger the video connection is generated, there is no need to manually perform searching and connecting for interaction video in the first client, a match pool for establishing a video interaction connection by the streaming host is expanded, the degree of match and the rate of effective match between streaming hosts are improved.

The above description is merely preferred embodiments of the present disclosure and an illustration of technical principles employed. Those skilled in the art should understand that the disclosure scope involved in the present disclosure is not limited to technical solutions formed by a specific combination of the above mentioned technical features, and should also cover other technical solutions formed by any combination of the above technical features or their equivalents without departing from the above disclosed concept, such as a technical solution formed by replacing the above technical features with the technical features disclosed in the present disclosure (but not limited to) with similar functions.

Additionally, although respective operations are described in a particular order, this should not be construed as requiring that the operations be performed in the shown particular order or executed in a sequential order. Under a certain circumstance, multitasking and parallel processing may be advantageous. Likewise, although several specific implementations are contained in the above discussion, these should not be construed as limitations on the scope of the present disclosure. Certain features that are described in the context of separate embodiments can also be implemented in combination in a single embodiment. Conversely, various features that are described in the context of the single embodiment can also be implemented in multiple embodiments separately or in any suitable sub-combination.

Although the subject matters have been described in language specific to structured features and/or methodological logical acts, it is to be understood that the subject matters defined in the appended claims are not necessarily limited to specific features or actions described above. Rather, the specific features and actions described above are merely exemplarily forms for implementing the claims.

What is claimed is:

1. A method of interaction video connection, wherein the method is applied to a first client and comprises:
   receiving interaction match information pushed by a server, wherein the interaction match information comprises first information of a second client, the first information of the second client is determined according to first data of the first client, and the first data is used to indicate a match demand category corresponding to the first client;
   generating timing information, and displaying, according to the interaction match information, the timing information and the first information of the second client, wherein the timing information indicates a remaining duration before requesting an establishment of a video connection with the second client; and
   establishing, according to the timing information, the video connection with the second client;
   wherein the timing information and the first information of the second client are displayed within a match request interface, the match request interface further comprises a cancel control, and the method further comprises:
   triggering the cancel control to close the match request interface; and
   sending first interaction refusal information, wherein the first interaction refusal information indicates that the first client refuses a video connection request corresponding to the interaction match information.

2. The method according to claim 1, wherein the timing information comprises a countdown value, and the establishing, according to the timing information, the video connection with the second client comprises:
   sending, when the countdown value is a first preset value, a video connection request to the second client, to establish a video connection with the second client.

3. The method according to claim 2, wherein the method further comprises:
   closing, if second interaction refusal information sent by the server is received, the match request interface; wherein, the second interaction refusal information is information sent from the second client to the server, and the second interaction refusal information indicates that the second client refuses the video connection request corresponding to the interaction match information.

4. The method according to claim 2, wherein the method further comprises:
   closing, if second interaction refusal information sent by the server is received, the match request interface; wherein, the second interaction refusal information is information sent from the second client to the server, and the second interaction refusal information indicates that the second client refuses the video connection request corresponding to the interaction match information.

5. The method according to claim 2, wherein the match request interface further comprises a setting control unit, and the method further comprises:
   triggering the setting control unit to display a setting page, wherein the setting page is used for setting a frequency of receiving the interaction match information pushed by the server.

6. The method according to claim 5, further comprising:
   issuing, if the frequency at which the first client receives the interaction match information pushed by the server is set to a second preset value, prompt information at a preset time.

7. The method according to claim 2, further comprising:
   issuing, if the frequency at which the first client receives the interaction match information pushed by the server is set to a second preset value, prompt information at a preset time.

8. The method according to claim 1, wherein the method further comprises:
   closing, if second interaction refusal information sent by the server is received, the match request interface; wherein, the second interaction refusal information is information sent from the second client to the server, and the second interaction refusal information indicates that the second client refuses a video connection request corresponding to the interaction match information.

9. The method according to claim 8, wherein the match request interface further comprises a setting control unit, and the method further comprises:
   triggering the setting control unit to display a setting page, wherein the setting page is used for setting a frequency of receiving the interaction match information pushed by the server.

10. The method according to claim 9, further comprising:
    issuing, if the frequency at which the first client receives the interaction match information pushed by the server is set to a second preset value, prompt information at a preset time.

11. The method according to claim 1, wherein the match request interface further comprises a setting control unit, and the method further comprises:
    triggering the setting control unit to display a setting page, wherein the setting page is used for setting a frequency of receiving the interaction match information pushed by the server.

12. The method according to claim 11, further comprising:
    issuing, if the frequency at which the first client receives the interaction match information pushed by the server is set to a second preset value, prompt information at a preset time.

13. The method according to claim 1, further comprising:
    determining, according to historical data of the first client, the first data; and
    setting, according to the first data, a frequency at which the first client receives the interaction match information pushed by the server.

14. The method according to claim 1, further comprising:
uploading the first data to the server, to enable the server to generate the interaction match information; and/or,
determining a time for the server to push the interaction match information to the first client.

15. An electronic device, comprising: at least one processor and a memory;
wherein the memory stores computer-executed instructions; and
the at least one processor executes the computer-executed instructions to cause the at least one processor to execute following steps:
receiving interaction match information pushed by a server, wherein the interaction match information comprises first information of a second client, the first information of the second client is determined according to first data of a first client, and the first data is used to indicate a match demand category corresponding to the first client;
generating timing information, and displaying, according to the interaction match information, the timing information and the first information of the second client, wherein the timing information indicates a remaining duration before requesting an establishment of a video connection with the second client; and
establishing, according to the timing information, the video connection with the second client;
wherein the timing information and the first information of the second client are displayed within a match request interface, the match request interface further comprises a cancel control, and the at least one processor executes the computer-executed instructions to cause the at least one processor to further execute following steps:
triggering the cancel control to close the match request interface; and
sending first interaction refusal information, wherein the first interaction refusal information indicates that the first client refuses a video connection request corresponding to the interaction match information.

16. A non-transitory computer readable storage medium, wherein computer-executed instructions are stored in the computer readable storage medium, when a processor executes the computer-executed instructions, following steps are implemented:
receiving interaction match information pushed by a server, wherein the interaction match information comprises first information of a second client, the first information of the second client is determined according to first data of a first client, and the first data is used to indicate a match demand category corresponding to the first client;
generating timing information, and displaying, according to the interaction match information, the timing information and the first information of the second client, wherein the timing information indicates a remaining duration before requesting an establishment of a video connection with the second client; and
establishing, according to the timing information, the video connection with the second client;
wherein the timing information and the first information of the second client are displayed within a match request interface, the match request interface further comprises a cancel control, and when a processor executes the computer-executed instructions, following steps are further implemented:
triggering the cancel control to close the match request interface; and
sending first interaction refusal information, wherein the first interaction refusal information indicates that the first client refuses a video connection request corresponding to the interaction match information.

* * * * *